United States Patent
Zhang et al.

(10) Patent No.: US 11,394,814 B2
(45) Date of Patent: Jul. 19, 2022

(54) PATH CONTROL BY END HOSTS IN NETWORKS

(71) Applicant: Alibaba Group Holding Limited, Grand Cayman (KY)

(72) Inventors: Zhehui Zhang, Los Angeles, CA (US); Xiangning Yu, Saratoga, CA (US); Haiyong Wang, Medina, WA (US); Haiyang Zheng, San Jose, CA (US); Jiayao Hu, Milpitas, CA (US); Guohui Wang, Burlingame, CA (US)

(73) Assignee: Alibaba Group Holding Limited, George Town (KY)

( * ) Notice: Subject to any disclaimer, the term of this patent is extended or adjusted under 35 U.S.C. 154(b) by 76 days.

(21) Appl. No.: 16/879,560

(22) Filed: May 20, 2020

(65) Prior Publication Data
US 2021/0368029 A1    Nov. 25, 2021

(51) Int. Cl.
    *H04W 56/00*    (2009.01)
    *H04L 69/22*    (2022.01)
    *H04L 45/00*    (2022.01)
    *H04L 47/19*    (2022.01)

(52) U.S. Cl.
    CPC .......... *H04L 69/22* (2013.01); *H04L 45/38* (2013.01); *H04L 47/196* (2013.01)

(58) Field of Classification Search
    CPC ........ H04L 69/22; H04L 45/38; H04L 47/196
    USPC ........................................... 370/392
    See application file for complete search history.

(56) References Cited

U.S. PATENT DOCUMENTS

| | | |
|---|---|---|
| 5,305,412 A | 4/1994 | Paoli |
| 6,016,219 A | 1/2000 | Fatehi |
| 6,175,560 B1 | 1/2001 | Bhagalia et al. |
| 6,266,168 B1 | 7/2001 | Denkin |
| 6,341,032 B1 | 1/2002 | Fukashiro |
| 6,433,922 B1 | 8/2002 | Ghera |
| 6,650,468 B1 | 11/2003 | Bryant |
| 6,754,420 B2 | 6/2004 | Tsuritani |
| 6,952,395 B1 | 10/2005 | Manoharan |
| 7,024,110 B2 | 4/2006 | Jasti |
| 7,123,404 B1 | 10/2006 | Mori |
| 7,136,583 B2 | 11/2006 | Oberg |
| 7,231,146 B2 | 6/2007 | Arecco |
| 7,400,829 B2 | 7/2008 | Watanabe |
| 7,756,422 B2 | 7/2010 | Sakamoto |
| 8,822,895 B2 | 9/2014 | Abedin |
| 9,712,239 B2 | 7/2017 | Murshid |
| 9,787,418 B2 | 10/2017 | Earl |
| 9,917,672 B2 | 3/2018 | Jensen |
| 10,230,464 B2 | 3/2019 | Yuan |
| 10,320,691 B1 * | 6/2019 | Matthews ............. H04L 45/121 |
| 2001/0021045 A1 | 9/2001 | Tervonen |
| 2002/0154353 A1 | 10/2002 | Heath |
| 2002/0191904 A1 | 12/2002 | Kani |
| 2004/0037555 A1 | 2/2004 | Evangelides |

(Continued)

*Primary Examiner* — Sai Ming Chan
(74) *Attorney, Agent, or Firm* — Shun Yao; Yao Legal Services, Inc.

(57) ABSTRACT

One embodiment described herein provides a system and method for path control in a network. During operation, in response to determining that a path-control condition is met, an end host in the network can determine an offset value to be applied to a packet header of a packet, modify the packet header by applying the determined offset value, and forward the packet based on the modified packet header.

23 Claims, 6 Drawing Sheets

(56) References Cited

U.S. PATENT DOCUMENTS

| | | |
|---|---|---|
| 2004/0090662 A1 | 5/2004 | Bang |
| 2004/0114925 A1 | 6/2004 | Berthold |
| 2004/0146305 A1 | 7/2004 | Neubelt |
| 2004/0175187 A1 | 9/2004 | Eiselt |
| 2004/0208506 A1 | 10/2004 | Kinoshita |
| 2004/0213577 A1 | 10/2004 | Sugahara |
| 2005/0025486 A1 | 2/2005 | Zhong |
| 2005/0047781 A1 | 3/2005 | El-Reedy |
| 2005/0074236 A1 | 4/2005 | Urimindi |
| 2005/0078601 A1* | 4/2005 | Moll .................. H04L 45/00 370/218 |
| 2005/0110980 A1 | 5/2005 | Maehara |
| 2006/0067346 A1* | 3/2006 | Tucker ............. G06F 12/1081 370/412 |
| 2006/0087975 A1 | 4/2006 | Zheng |
| 2006/0115266 A1 | 6/2006 | Levi |
| 2006/0165079 A1* | 7/2006 | Rodrigo ............. H04L 47/10 370/389 |
| 2006/0176545 A1 | 8/2006 | Nakamura |
| 2008/0008183 A1* | 1/2008 | Takagaki ........... H04L 47/193 370/392 |
| 2009/0028562 A1 | 1/2009 | Gianordoli |
| 2009/0067843 A1 | 3/2009 | Way |
| 2009/0103915 A1 | 4/2009 | Aprile |
| 2009/0226174 A1 | 9/2009 | Csupor |
| 2009/0245786 A1 | 10/2009 | Sakamoto |
| 2009/0262790 A1 | 10/2009 | Molotchko |
| 2009/0290837 A1 | 11/2009 | Chen |
| 2010/0091355 A1 | 4/2010 | Ota |
| 2010/0284687 A1 | 11/2010 | Tanzi |
| 2010/0290780 A1 | 11/2010 | Teipen |
| 2010/0296808 A1 | 11/2010 | Henning |
| 2011/0116786 A1 | 5/2011 | Wellbrock |
| 2011/0126005 A1 | 5/2011 | Carpenter |
| 2011/0274435 A1 | 11/2011 | Fini |
| 2012/0020672 A1 | 1/2012 | Aguren |
| 2012/0033966 A1 | 2/2012 | Rosenbluth |
| 2012/0078708 A1* | 3/2012 | Taylor ............... G06Q 30/0242 705/14.41 |
| 2012/0106971 A1 | 5/2012 | Sugaya |
| 2012/0281950 A1 | 11/2012 | Fattal |
| 2012/0294604 A1 | 11/2012 | Roberts |
| 2013/0189856 A1 | 7/2013 | Ko |
| 2013/0223484 A1 | 8/2013 | Tang |
| 2013/0236175 A1 | 9/2013 | Sethumadhavan |
| 2013/0243438 A1 | 9/2013 | Tang |
| 2013/0272694 A1 | 10/2013 | Sandstrom |
| 2013/0343757 A1 | 12/2013 | Wigley |
| 2014/0013402 A1 | 1/2014 | Bugenhagen |
| 2014/0029941 A1 | 1/2014 | Bratkovski |
| 2014/0105592 A1 | 4/2014 | Kataria |
| 2014/0153922 A1 | 6/2014 | Ryf |
| 2014/0186021 A1 | 7/2014 | Striegler |
| 2014/0199065 A1 | 7/2014 | Bratkovski |
| 2014/0205286 A1 | 7/2014 | Ji |
| 2014/0248059 A1 | 9/2014 | Tang |
| 2014/0258772 A1 | 9/2014 | Kataria |
| 2014/0286648 A1 | 9/2014 | Buelow |
| 2014/0307304 A1 | 10/2014 | Zhu |
| 2014/0363171 A1 | 12/2014 | Tang |
| 2015/0249501 A1 | 9/2015 | Nagarajan |
| 2015/0296279 A1 | 10/2015 | Bouda |
| 2015/0341123 A1 | 11/2015 | Nagarajan |
| 2016/0056889 A1 | 2/2016 | Le Taillandier De Gabory |
| 2016/0233959 A1 | 8/2016 | Murshid |
| 2016/0277101 A1 | 9/2016 | Jiang |
| 2016/0306115 A1 | 10/2016 | Koonen |
| 2017/0155466 A1 | 6/2017 | Zhou |
| 2017/0214463 A1 | 7/2017 | Milione |
| 2017/0299900 A1 | 10/2017 | Montoya |
| 2017/0353242 A1 | 12/2017 | Mansouri Rad |
| 2017/0353265 A1 | 12/2017 | Mansouri Rad |

* cited by examiner

| OFFSET | $h1(\textit{offset}) \oplus h1(0) \bmod 2$ | $h2(\textit{offset}) \oplus h2(0) \bmod 4$ |
|---|---|---|
| 0x00 | 0 | 0 |
| 0x01 | 1 | 1 |
| 0x02 | 1 | 0 |
| 0x03 | 0 | 2 |
| 0x04 | 0 | 3 |
| 0x05 | 1 | 0 |
| 0x06 | 1 | 1 |
| 0x07 | 0 | 2 |
| 0x08 | 1 | 3 |

210

PATH CONTROL BY END HOSTS IN NETWORKS

BACKGROUND

Field

This disclosure is generally related to path control in data centers. More specifically, this disclosure is related to a system and method for facilitating path control by end hosts in a network.

Related Art

Today's data centers often contain a large number (e.g., 100K) of servers, interconnected by a data center network (DCN), which can include thousands of pieces of network equipment (e.g., switches and links). Network congestion or hardware failures can cause packet loss, leading to impaired performance of user applications. Many data centers have implemented path diversity to recover from loss, improve throughput, and reduce latency. For example, multipath transmission control protocol (MPTCP) has been used by some data centers to improve throughput by leveraging multiple paths to avoid congestion. However, current MPTCP networks route packets using the equal-cost multipath (ECMP) routing strategy and may not fully use the path diversity provided by the network.

SUMMARY

One embodiment described herein provides a system and method for path control in a network. During operation, in response to determining that a path-control condition is met, an end host in the network can determine an offset value to be applied to a packet header of a packet, modify the packet header by applying the determined offset value, and forward the packet based on the modified packet header.

In a variation on this embodiment, the path-control condition is determined based on a first path computed according to the unmodified packet header, and forwarding the packet can include forwarding the packet on a second path computed according to the modified packet header. The first path and the second path do not overlap.

In a variation on this embodiment, determining that the path-control condition is met can include determining that a packet loss rate for a particular flow exceeds a predetermined threshold.

In a variation on this embodiment, determining that the path-control condition is met can include receiving a multipath remote direct memory access (RDMA) operation command.

In a variation on this embodiment, determining the offset value comprises looking up a table storing a mapping relationship between offset values and path differences.

In a further variation, the network can include a plurality of layers of switches, and determining the offset value can include identifying an offset value that maps to a non-zero path difference in every switch layer.

In a further variation, the network can include a plurality of types of switches, and the system can obtain the table storing the mapping relationship between the offset values and the path differences by performing an offline probing operation for each type of switch.

In a further variation, the network can include a plurality of types of switches, and the system can obtain the table storing the mapping relationship between the offset values and the path differences by computing a hash function of the packet header modified by the offset values for each type of switch.

In a variation on this embodiment, the received packet can include a transport control protocol (TCP) packet or a user datagram protocol (UDP) packet.

In a further variation, modifying the packet header can include performing an XOR operation between one or more header fields and the determined offset value, and the one or more header fields can include one or more of: a source-port number field, a reserved-bit field, and an optional field.

In a variation on this embodiment, forwarding the received packet can include performing equal-cost multipath (ECMP)-based routing.

BRIEF DESCRIPTION OF THE FIGURES

In the figures, like reference numerals refer to the same figure elements.

DETAILED DESCRIPTION

Figure 1:
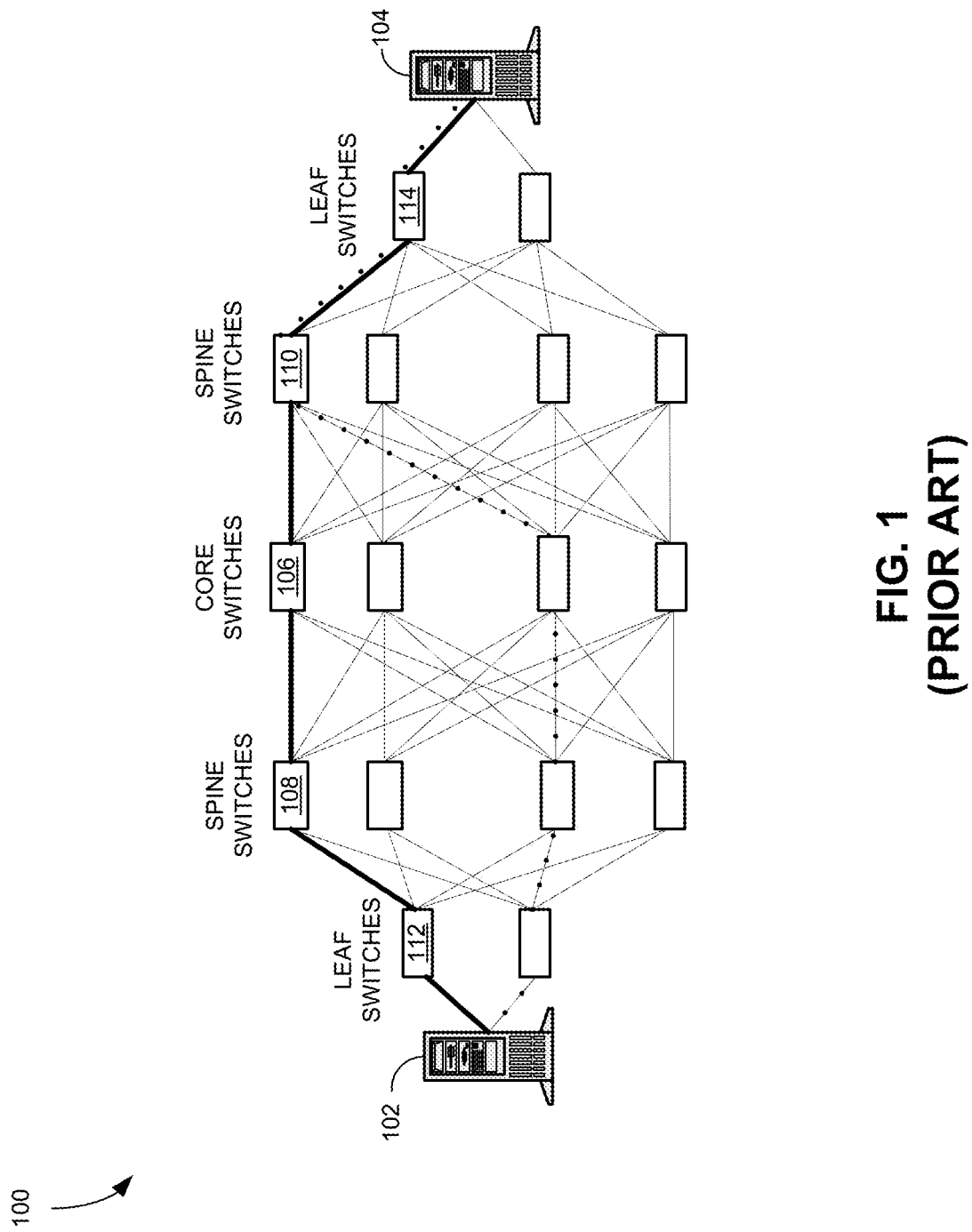
FIG. 1 presents a diagram illustrating a path-recovery example, according to prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, methods and systems are presented for facilitating end host path control in data centers. A data center network (DCN) can include a number of switches, each using a certain hash algorithm to perform ECMP routing. Before implementing the path control, the system can probe the switches in the network to obtain a mapping between the offset in the packet header and the path changes (e.g., changes in the switch port ID). Such a mapping can be used to select diverse paths that share no overlapping link. More specifically, by changing the packet header (e.g., a TCP or UDP header), the system can compute a new path that does not share a link with the congested or failed path.

Path Control in Data Center

There are three types of routing-control mechanisms. One is the in-network control mechanism, where in-network switches control the path using routing protocols, such as the bidirectional forwarding detection (BFD) protocol and the border gateway protocol (BGP). These approaches detect failures by monitoring heartbeats and may fail to detect heavy-load data-packet-exclusive failure. Another one is the end-host-control mechanism, such as a source-routing based end-host-path-control mechanism. This approach may incur excessive routing table storage and can be inadequate to adapt to fast in-network failure. Certain end-host-path-control approaches attempt to provide real-time load balancing among subflows, but may still be insufficient to leverage path diversity and can introduce out-of-order problems. Another mechanism combines both the in-network control and the endhost control by implementing a centralized controller that aggregates route information from in-network switches and disseminates route information to end hosts. However, this solution is subject to delayed routing information updates.

Among these existing approaches, an ECMP-based end-host-path-control mechanism has the potential to leverage the path diversity in the data center network to recover from loss, improve throughput, and reduce latency. Equal-cost multipath (ECMP) is a network routing strategy that allows for traffic with the same source and destination to be transmitted across multiple paths of equal cost. It provides a mechanism to load balance traffic and increase bandwidth by fully using otherwise unused bandwidth on links to the same destination. When forwarding a packet, the routing technology must decide which next-hop path to use. In making a determination, the router can take into account the packet header fields (e.g., TCP or UDP headers) that identify a flow. When ECMP is used, next-hop paths of equal cost are identified based on routing metric calculations and hash algorithms. That is, routes of equal cost have the same preference and metric values, and the same cost to the network. The ECMP process identifies a set of routers, each of which is a legitimate equal cost next hop toward the destination. The routes that are identified are referred to as an ECMP set.

However, existing ECMP-based path control approaches rely on ECMP to select paths based on the packet header. The selected paths may have overlapping links, which can lead to possible failure in loss recovery. For example, after a link failure, a particular end host may attempt to select a new path (i.e., a new next-hop node) from the ECMP set to deliver the packet. However, because the end host is unaware of the path-selection mechanism employed by the ECMP, the new path selected by the end host may have one or more links that overlap the previous path with the failed link. It is also possible for the one or more overlapping links to include the failed link, thus causing the new path to fail.

FIG. 1 presents a diagram illustrating a path-recovery example, according to prior art. In FIG. 1, network 100 can include a number of servers (e.g., servers 102 and 104) and a number of switch layers. A core switch layer can include a number of core switches (e.g., core switch 106), a spine switch layer can include a number of spine switches (e.g., spine switches 108 and 110), and a leaf switch layer can include a number of leaf switches (e.g., leaf switches 112 and 114). The switches are interconnected, providing a number of parallel paths between servers 102 and 104.

FIG. 1 shows a path between servers 102 and 104 that includes switches 112, 108, 106, 110, and 114, as indicated by thickened solid lines connecting the switches. FIG. 1 also shows that, in the event of this path experiencing failure, server 102 may select a different path, as indicated by the dotted line. In this example, subsequent to detecting failure on the previous path, server 102 may choose a leaf switch that is different from left switch 112 (which is on the previous path) to forward the packet. That leaf switch, along with other switches on the new path, can choose an ECMP link based on the header fields of the packet. However, as one can see from FIG. 1, the new path and the previous failed path overlap at certain links. More specifically, the new path and the previous path share the link between switches 110 and 114 and the link between switch 114 and server 104. This can create a problem, because these two links may include a failed link, causing the new path to fail as well. To prevent such a situation, in some embodiments, the end host can implement a path-control mechanism that guarantees that the new path and the previous failed path do not have any overlapping links. More specifically, this can be achieved by deliberately changing the packet header fields.

A typical ECMP-enabled router uses a hashing algorithm to select paths, and common hashing algorithms used by ECMP-enabled routers can include cyclic redundancy check (CRC) algorithm and XOR algorithm. Both algorithms can guarantee linearity, meaning $h(a \oplus b \oplus c) = h(a) \oplus h(b) \oplus h(c)$, where h is the hash function, and a, b, and c are different packet headers. The linear property of these hashing algorithms also means that changes in the hashing value of the packet header can be predictable if the packet header is XORed with a predetermined offset. For example, for any header i, one can have $h(i) \oplus h(i \oplus \text{offset}) = h(\text{offset}) \oplus h(0)$, where h(0) is the hash function of an empty header. This means that adding an offset to a packet header can result in the same path change, regardless of the value of the packet header, or the slope of the hashing remains constant. In addition, if the CRC algorithm uses the same polynomial as the hashing dividend, the mapping between the header offset and the path changes also remains the same, regardless of the value of the header field. Therefore, by learning the mapping between the header offset and the path changes, one can achieve the desired path change.

Figures 2A, 2B:
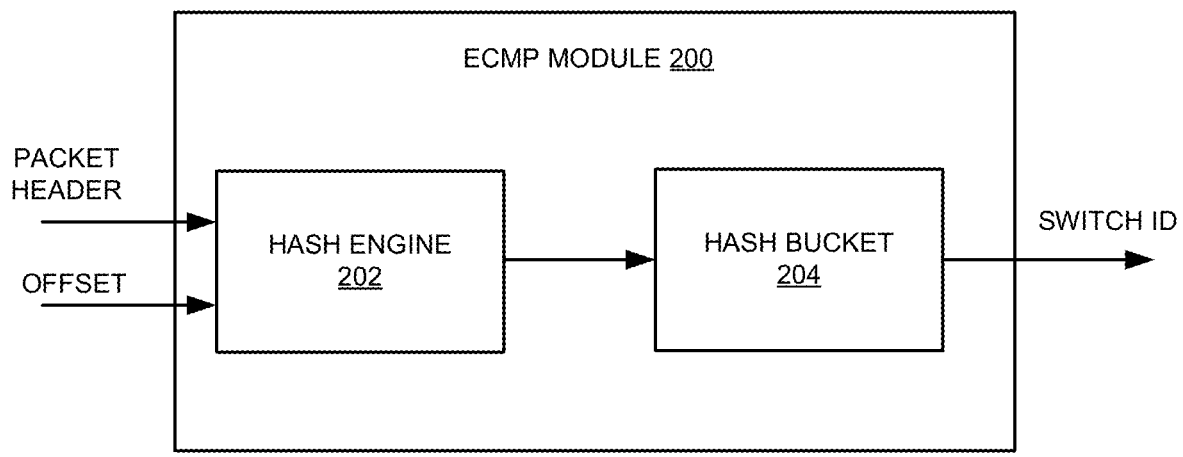
FIG. 2A illustrates an exemplary offline-probing scenario to learn the header-offset-to-path-change mapping, according to one embodiment.
FIG. 2B illustrates the exemplary mapping between the header offset and the path change, according to one embodiment.

Most commercially available switches do not make their hashing algorithms available to customers. Hence, offline probing is needed to learn, for each type of switch, the mapping between the offset on packet headers and the path change. FIG. 2A illustrates an exemplary offline-probing scenario to learn the header-offset-to-path-change mapping, according to one embodiment. During probing, a packet header (which can be an empty header or any random header) and an offset value can be sent to ECMP module 200 of a particular switch. ECMP module 200 can include a hash engine 202 and a hash bucket 204. Hash engine 202 computes the hash function, and hash bucket 204 stores the computed hash functions. The hashing algorithm used by hash engine 202 is unknown to the user. Based on the computed hash function, ECMP module 200 can output a switch port number or a switch ID, which identifies the next-hop link. The switch port number or ID can be obtained by computing the modulus of the hash value over the number of switches in the ECMP set. To learn the mapping between the header offset and the path change, one can first obtain the switch ID outputted by ECMP module 200 for an unmodified packet header, and then obtain the switch IDs outputted by ECMP module 200 for packet headers modified by applying various offsets. The mapping between the packet header offsets and the path changes can then be obtained, as shown in FIG. 2B.

Typical packet headers can include a number of fields, and the ECMP may use a subset of the fields to compute the hash function when selecting a next-hop link. For example, in TCP-based applications, ECMP module 200 may compute the hash function using the 5-tuple that includes the source IP address, the source port number, the destination IP address, the destination port number, and the protocol field. On the other hand, for layer 2 (e.g., Ethernet) applications, ECMP module 200 may compute the hash functions using the source and destination MAC addresses. Note that some fields, such as the source and destination addresses and the protocol field, cannot be modified. To apply the header offset, in some embodiments, the system can make use of other header fields, such as the source port number, the reserved bits, or certain optional fields. For example, the system can modify the source port number by XORing the original port number with the offset. Alternatively, the system may use the offset value to XOR the reserved bits (which are normally zeros) or one or more optional fields. Note that, because conventional ECMP modules do not include the reserved bits or optional fields in their hashing operations, one needs to reconfigure ECMP module 200 to include the reserved bits or optional fields in the hashing operations, if the offsets are applied to the reserved-bit field or the optional fields, respectively.

FIG. 2B illustrates the exemplary mapping between the header offset and the path change, according to one embodiment. More specifically, FIG. 2B shows a table 210, which is obtained for a network similar to network 100 shown in FIG. 1. The first column of table 210 includes the various offset values (e.g., 0x00-0x08). The second column of table 210 includes the path changes (e.g., changes to the output switch ID) for each offset value under hash function h1; and the third column of table 210 includes the path changes for each offset value under hash function h2. In this example, hash function h1 can be used by the servers and the spine switches, whereas hash function h2 can be used by the core switches and the leaf switches. Note that, because the ECMP set at the server has two switches (i.e., the two leaf switches), computing the switch ID involves computing the hashing value modulo 2. On the other hand, because the ECMP set at each core switch can include four switches (i.e., the four spine switches), computing the switch ID involves computing the hashing value modulo 4. In fact, the path difference at each switch can be expressed as h(offset)⊕h(0) mod(# of ports), where h is the hash function used by the ECMP module on the switch, h(offset) the computed hash function of the offset, and h(0) the hash function of an empty header. Note that computing the hash function involves a configurable hash seed, and different switches in the same layer (e.g., the different core switches) can have different seeds. However, as long as these switches are configured using the same algorithms, the path change in different switches with different seeds can be the same for the same header offset. In other words, there is no need to run the offline probing for different seed values.

From FIG. 2B, one can see that for different offset values, the path change at different switches can be different. More specifically, certain offset values may not result in a path change. For example, one can see from table 210 that, when the offset value is 0x02, the path change (i.e., the change of the switch ID) at a server can be +1 and path change at a core switch can be 0. In other words, when an offset of 0x02 is applied to the packet header, the server will select a switch having an ID change of +1 (i.e., the other switch of the two leaf switches) as the next hop, whereas the core switch will select the same next-hop switch (path difference is 0) to forward the packet. On the other hand, when an offset of 0x03 is applied to the packet header, the server will select the same next-hop switch, whereas the core switch will select a switch having an ID change of +2 as the next-hop switch. In other words, if the core switch selects switch_1 as the next-hop switch based on the original packet header, it will select switch_3 as the next-hop switch based on the new packet header with the 0x03 offset.

One can also see from FIG. 2B that, among all offsets, a subset of offsets can result in a non-zero path change at all switch layers, such as offsets 1, 6, and 8. These offsets can guarantee path diversity, because at each hop, the switch will select a next-hop switch that is different from the switch on the previous path that is determined by the original packet header. As a result, the new path determined by the new packet header and the original path determined by the original packet header do not have overlapping links. Hence, in the event of the original path experiencing a link failure, one can apply one of these three offsets to the packet header, and a new path with no overlapping link can be determined. The likelihood of the new path encountering a link failure can be much lower. In some embodiments, the system can randomly select, among the possible offsets that result in non-zero path changes across all switch layers, an offset to be applied to the packet header.

Figure 2C:
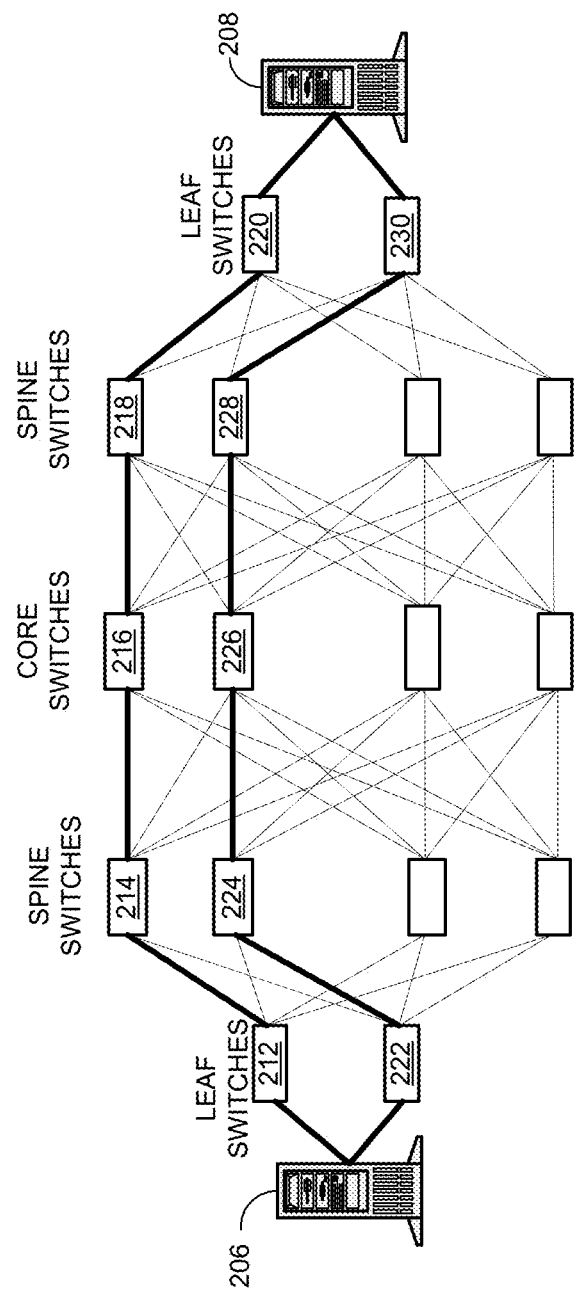
FIG. 2C illustrates an exemplary path-control result, according to one embodiment.

FIG. 2C illustrates an exemplary path-control result, according to one embodiment. In the example shown in FIG. 2C, to maximize the path diversity, the system selects an offset that can result in a non-zero path difference at each and every switch layer, such as an offset value of 0x01. FIG. 2C shows that, before the selected offset is applied to its packet header, a packet can be routed from server 206 to server 208 via a top path that includes switches 212, 214, 216, 218, and 220. However, in the event that this top path experiences a failure, the system can apply an offset of 0x01 or 0x06 to the packet header of subsequent packets in the same flow. For example, the system can modify the packet header by XORing the source port number using the offset. Alternatively, the system can modify the packet header by inserting the offset into the previously empty reserved-bit field (which can be a 4-bit field in a TCP/IP header) or one or more optional fields in the packet header. The modification of the packet header can be done by software or hardware that processes the packet.

According to table 210 shown in FIG. 2B, applying an offset of 0x01 or 0x06 to the packet header can cause the ECMP module on each switch to select a next-hop switch that has a switch ID difference of one. In other words, the difference in switch ID between the new path and the original path at each switch layer is one. As shown in FIG. 2C, after applying the header offset, the new path between servers 206 and 208 can include switches 222, 224, 226, 228, and 230. One can also see from FIG. 2C that there is no overlapping link between the new path and the original top path. Consequently, the likelihood of both the original path and the new path failing can be rather small.

Also note that most header field offset values can result in path changes in some, if not all, switch layers. This means by applying the offset to the packet header, the system can change at least a portion of the path the packet was travelling on, thus potentially avoiding the failed link. In some embodiments, the system may choose to randomly apply an offset to the packet header, without considering whether the resulting path partially overlaps with the previously failed path. This way, it is no longer necessary to perform the offline probing, and path-selection can be done more rapidly. However, there is the risk of the new path containing the failed link, which can require multiple attempts to select a path.

Figure 3:
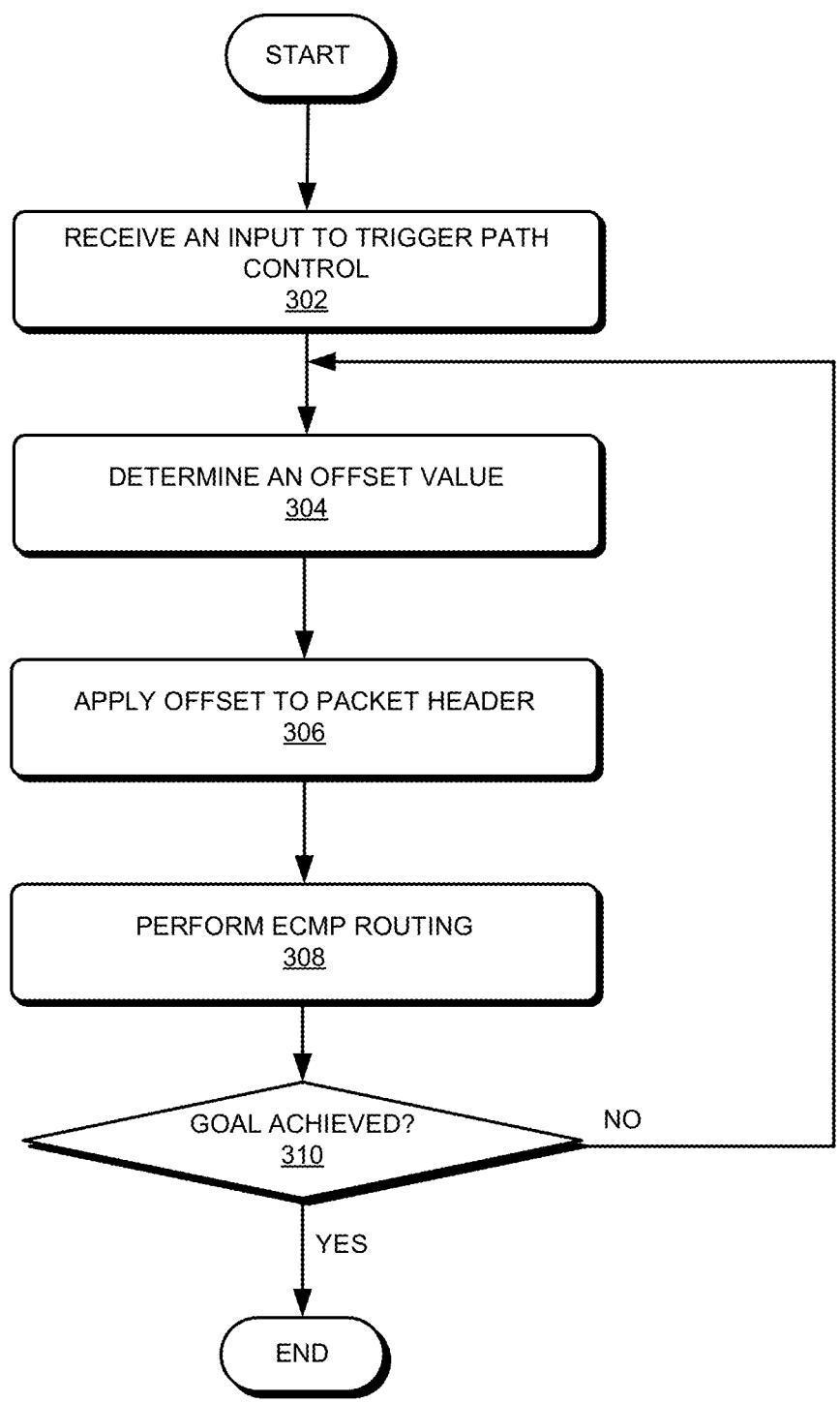
FIG. 3 presents a flowchart illustrating an exemplary path-control process, according to one embodiment.

FIG. 3 presents a flowchart illustrating an exemplary path-control process, according to one embodiment. During operation, the system receives an input that triggers path control (operation 302). A number of applications may trigger the end host path control. For example, the end host may observe packet loss on one path and need to select a new path to transmit packets. Moreover, in data centers that implement multipath remote direct memory access (RDMA), an RDMA operation command can trigger the end host to select multiple non-overlapping paths. Other applications that need to leverage path diversity to improve performance may also trigger the path-control operation.

In response to the path-control operation being triggered, the system can determine an offset value to be applied to the packet header (operation 304). In some embodiments, the system can look up the table that maps the packet header offset to the path change (e.g., the change in the output of the ECMP hashing algorithm) to select an offset value that can result in a non-zero path difference at each and every switch layer. In the exemplary mapping table shown in FIG. 2B, there are two columns representing the two different types of switch used in the network. A network (e.g., a DCN) may deploy switches manufactured by multiple (e.g., more than two) vendors, with each type of switch implementing a unique hashing algorithm for ECMP. Common hashing algorithms can include CRC32, CRC16, XOR32, and XOR16. Depending on the different hashing algorithms implemented by the different switches, the packet-header-offset-to-path-difference mapping can be different. For example, the mapping table can have more or fewer columns or the path-difference for each header offset can be different.

In some embodiments, the packet-header-offset-to-path-difference mapping table is obtained via offline probing, where the system applies a number of offsets to a random packet header and observes the ECMP path selection result at each individual switch. In the example shown in FIG. 2B, eight different offset values have been used to probe the switches. In practice, the offline probing can use more or fewer offset values for testing. In practice, the offline probing can stop as long as the number of offset values that can lead to a non-zero path difference in all switch layers exceeds a minimum threshold. Theoretically, the minimum threshold can be one. To provide redundancy, the system may choose the minimum threshold value to be more than one. To minimize the changes made to the packet header field, the number of valid bits in the offset can be kept low, such as fewer than 8 or 16 bits.

In some embodiments, if the ECMP hashing algorithms used by the switches are known, the packet-header-offset-to-path-difference mapping table can be computed, without the need to perform the offline probing. More specifically, the hashing value change for each offset at a particular switch can be computed using $h(\text{offset}) \oplus h(0)$, given that h is the known ECMP hash function used at that particular switch. The output port number or switch ID of the ECMP can be determined by the internal mapping between the hashing value and the port ID. Most switches have deterministic internal mapping between the hashing value and the switch port number. Hence, once the hashing values are computed the selected switch port can be known. In situations where the offsets are to be applied to the source port field in a TCP or UDP header, the system can record the output hashing values of various source port fields at each switch.

While looking up the mapping table, the system can determine an offset value that can lead to a non-zero path difference at every switch. In other words, when searching the packet-header-offset-to-path-difference mapping table (e.g., mapping table 210 shown in FIG. 2B), the system can identify one or more rows that do not include any zeros. The offset value corresponding to each identified row maps to a path that does not share an overlapping link with the original path, which can be determined based on the original packet header with no offset. If there are multiple offset values that can map to non-overlapping paths, the system can randomly select one offset value from the multiple offset values. In an alternative embodiment, the system may be configured to select a random offset value without considering whether such an offset can result in a completely non-overlapping path.

Subsequently, the system applies the determined offset to the packet header (operation 306). Applying the offset to the packet header can involve XORing the offset with one or more header fields. For example, the system can modify the source port number in the packet header by XORing the determined offset value with the original source port number. Alternatively, the system can insert the offset to the reserved-bit field or an optional field, which typically includes all zeros. If these fields include non-zero bits, then the XOR operation will be performed. Applying the offset to the packet header can be done by the packet-processing hardware or software.

The system can then perform ECMP routing on subsequently received packets based on the modified packet headers (operation 308). If applying the offset only affects the packet header field that is included in standard ECMP operations, the system does not need to change its ECMP operation. For example, the source port number is included in the standard ECMP routing port calculation. Therefore, if the packet offset is applied to the source port field, conventional ECMP routing can be performed. On the other hand, if applying the offset affects the reserved-bit field or an optional field, the conventional ECMP algorithm needs to be reconfigured to include the reserved-bit field or the optional field when computing the hash function.

The system can then determine if the path-control goal is achieved (operation 310). If the path control is triggered by packet loss, the system can monitor the network traffic to determine if the loss recovery was successful (e.g., the packet loss rate is below a predetermined threshold). If the path control is triggered by a multipath RDMA operation, the system can determine if the selected multiple paths provide the needed path diversity (e.g., do not have any overlapping link). If the path-control goal is not yet achieved, the system repeats the path-control process by determining a new packet header offset value that can be applied (operation 304). Otherwise, the process ends.

Figure 4:
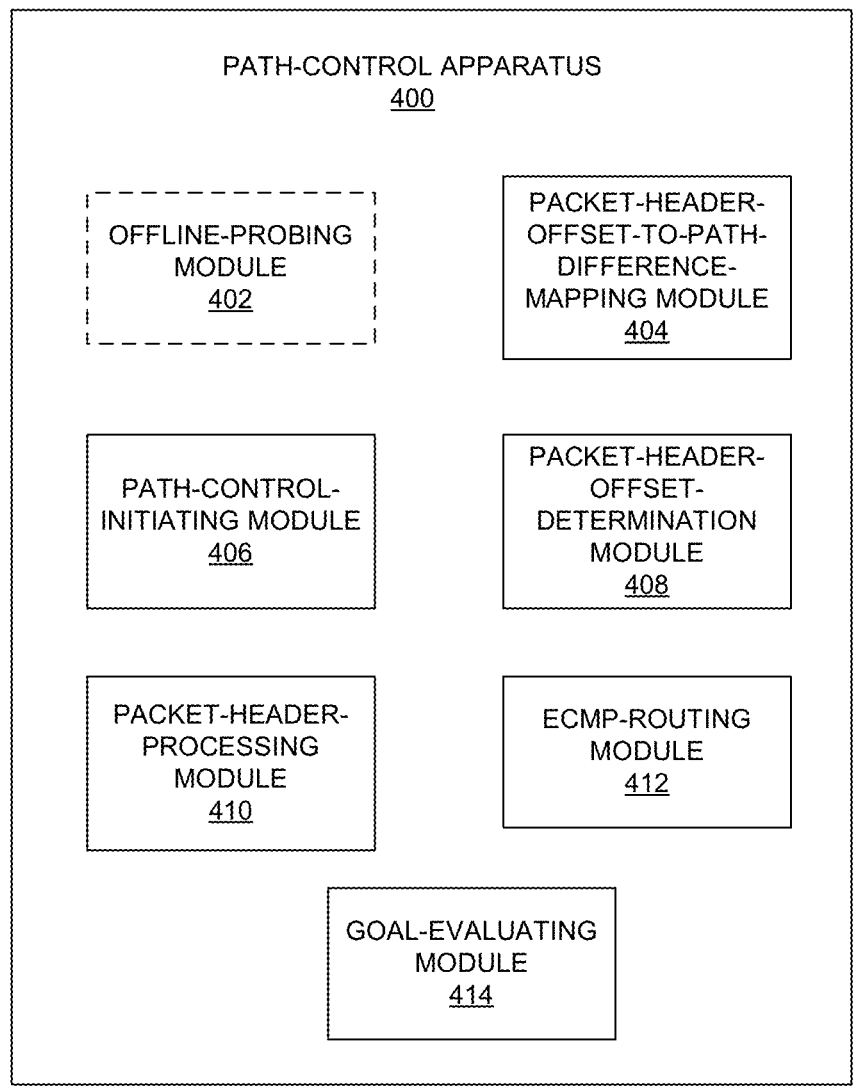
FIG. 4 illustrates an exemplary apparatus for implementing the path control, according to one embodiment.

FIG. 4 illustrates an exemplary apparatus for implementing the path control, according to one embodiment. Path-control apparatus 400 can include an optional offline-probing module 402, a packet-header-offset-to-path-difference mapping module 404, a path-control-initiating module 406, a packet-header-offset-determination module 408, a packet-header-processing module 410, an ECMP-routing module 412, and a goal-evaluating module 414. In some embodiments, path-control apparatus 400 can be located at an end host in a network, such as a data center network.

Offline-probing module 402 can perform offline probing on switches in the network in order to determine the mapping between a plurality of packet header offset values and path changes. The packet header can be a TCP header or a UDP header, depending on the application. The number of effective bits in the offset value can be limited to a predetermined value, such as 8 or 16. In some embodiments, the offline probing can start with a non-zero value (e.g., 1) and increment by 1 for each probe until a predetermined minimum number of offset values that can generate non-overlapping paths can be identified. Alternatively, the offline probing can test all possible offset values for the predetermined number of bits. For example, if the offset value is 4-bits long, up to 15 offset values can be tested during offline probing. Offline-probing module 402 is optional, because if the ECMP hashing algorithms used by the switches are known, there is no need to perform offline probing.

Packet-header-offset-to-path-difference-mapping module 404 stores the mapping relationship between a plurality of packet header offset values and the path change resulting from applying the offsets on the packet header. Note that such a mapping relationship is independent of the value of the packet header. Depending on whether the ECMP hashing algorithms used by the switches are known, packet-header-offset-to-path-difference-mapping module 404 may obtain the mapping relationship via offline-probing module 402 or by computing the hash function. In some embodiments, the mapping table can be stored in the non-volatile memory of the end host.

Path-control-initiating module 406 can initiate the path-control process when it determines that path control is needed. For example, path-control-initiating module 406 can obtain packet-loss information associated with a specific flow and can initiate path control on subsequent packets of the same flow. In some embodiments, path-control-initiating module 406 can determine if a path-control condition is met based on the packet loss rate. If the packet loss rate for a particular flow exceeds a particular threshold, the path-control condition is met for that flow. In the multipath RDMA application, path-control-initiating module 406 can initiate the path control in response to receiving an RDMA operation command.

Packet-header-offset-determination module 408 can determine an offset value to be applied to the packet header. In some embodiments, to maximize path diversity, packet-header-offset-determination module 408 looks up the mapping table stored by packet-header-offset-to-path-difference mapping module 404 to identify one or more offset values that can cause a non-zero path difference in all switches. In other words, at any switch, the selection of the next hop will be different after the offset is applied to the packet header. If there are multiple such offset values, packet-header-offset-determination module 408 can randomly select one offset value to be applied to the packet header.

Packet-header-processing module 410 can apply the selected offset value on the packet header. In some embodiments, applying the offset can involve performing an XOR operation on one or more packet header fields. In some embodiments, the offset can be applied to the TCP or UDP source port number. Alternatively, the offset can be applied to the reserved-bit field or the one or more optional fields. In some embodiments, the XOR operation can be performed using hardware logic gates. Alternatively, the XOR operation can be performed by software.

ECMP-routing module 412 can perform the ECMP routing on packets based on the packet header. ECMP-routing module 412 can be configured to include additional fields, such as the reserved-bit field and the optional fields, when computing the hash function. Goal-evaluating module 414 can evaluate, subsequent to the path-control operation, whether the path-control goal is achieved using the determined packet header offset. For example, goal-evaluating module 414 can include a traffic monitor that monitors the packet-loss rate.

Figure 5:
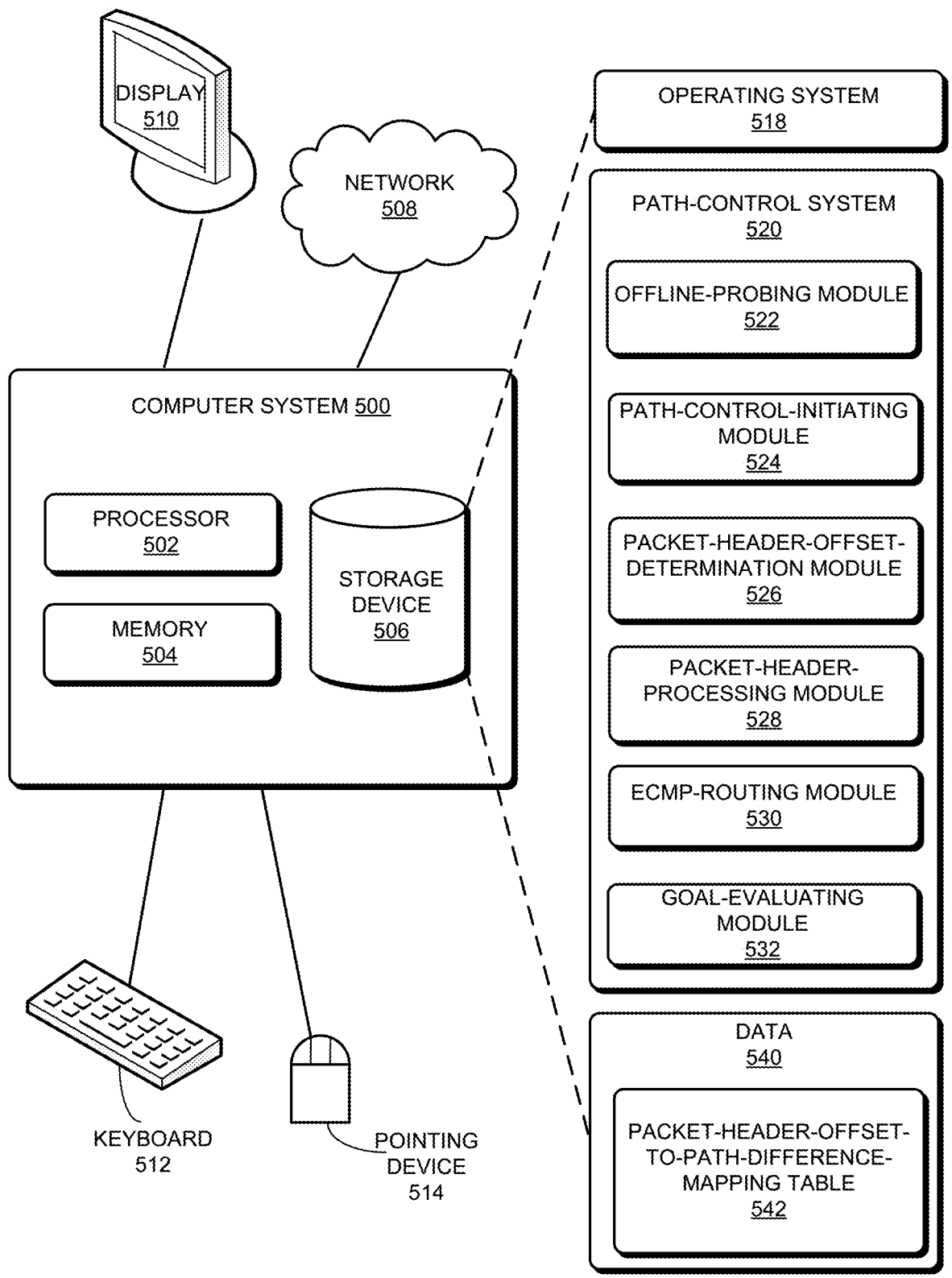
FIG. 5 illustrates an exemplary computer system that facilitates end host path control, according to one embodiment.

FIG. 5 illustrates an exemplary computer system that facilitates end host path control, according to one embodiment. Computer system 500 includes a processor 502, a memory 504, and a storage device 506. Computer system 500 can be coupled to a display device 510, a keyboard 512, and a pointing device 514, and can also be coupled via one or more network interfaces to network 508. Storage device 506 can store an operating system 518, a path-control system 520, and data 540.

Path-control system 520 can include instructions, which when executed by computer system 500 can cause computer system 500 to perform methods and/or processes described in this disclosure. Path-control system 520 can include instructions for performing offline probing on switches (offline-probing module 522), instructions for initiating path control (path-control-initiating module 524), instructions for determining an offset to the packet header (packet-header-offset-determination module 526), instructions for processing packet headers to apply the offset (packet-header-processing module 528), instructions for performing ECMP routing (ECMP-routing module 530), and instructions for evaluating whether the path-control goal is achieved using the determined packet header offset (goal-evaluating module 532). Data 540 can include a mapping table (packet-header-offset-to-path-difference-mapping table 542).

In general, the system provides an end-host-path-control mechanism that can be implemented by end hosts in a data center. The system leverages the path diversity in the data center network to provide solutions to a wide variety of problems, including reducing congestion in MPTCP, packet loss recovery, and multipath RDMA. The system maximizes the path diversity by selecting paths that do not share any overlapping link. To do so, the end host can apply an offset to the packet header fields, thus affecting the outcome of the ECMP hashing algorithm. By carefully selecting the offset value, the system can ensure that a path selected based on the modified packet header does not overlap the path selected based on the original packet header. Note that this solution is an end-to-end solution, which is able to detect failure of all kinds, making this an effective tool for loss recovery. Moreover, the solution is a distributed solution and can be readily deployed on the end hosts with compatibility to the legacy protocol stack. There is no need to modify the existing hardware on the end hosts.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method for path control in a network, the method comprising:
   determining that a path-control condition is met;
   determining, by an end host, an offset value to be applied to a packet header of a packet, wherein the packet header comprises a plurality of header fields comprising at least a reserved-bit field;
   performing an exclusive OR (XOR) operation on the reserved-bit field and the offset value to obtain a modified reserved-bit field;
   modifying the packet header by replacing the reserved-bit field in the packet header with the modified reserved-bit field; and
   forwarding the packet based on the modified packet header.

2. The method of claim 1, wherein the path-control condition is determined based on a first path computed according to the unmodified packet header of the packet, wherein forwarding the packet comprises forwarding the packet on a second path computed according to the modified packet header, and wherein the first path and the second path do not overlap.

3. The method of claim 1, wherein determining that the path-control condition is met comprises determining that a packet loss rate for a particular flow exceeds a predetermined threshold.

4. The method of claim 1, wherein determining that the path-control condition is met comprises receiving a multipath remote direct memory access (RDMA) operation command.

5. The method of claim 1, wherein determining the offset value comprises looking up a table storing a mapping relationship between offset values and path differences.

6. The method of claim 5, wherein the network comprises a plurality of layers of switches, and wherein determining the offset value comprises identifying an offset value that maps to a non-zero path difference in each switch layer.

7. The method of claim 5, wherein the network comprises a plurality of types of switches, and wherein the method further comprises obtaining the table storing the mapping relationship between the offset values and the path differences by performing an offline probing operation for each type of switch.

8. The method of claim 5, wherein the network comprises a plurality of types of switches, and wherein the method further comprises obtaining the table storing the mapping relationship between the offset values and the path differences by computing hash functions of the packet header modified by the offset values for each type of switch.

9. The method of claim 1, wherein the packet comprises a transport control protocol (TCP) header or a user datagram protocol (UDP) header.

10. The method of claim 1, wherein the header fields further comprise a source-port field and an optional field, and wherein modifying the packet header further comprises one or more of:
    performing an XOR operation on the source-port field and the determined offset value; and
    performing an XOR operation on the optional field and the determined offset value.

11. The method of claim 1, wherein forwarding the packet comprises performing equal-cost multipath (ECMP)-based routing.

12. A path-control apparatus, comprising:
    a path-control-initiating module configured to determine that a path-control condition is met and initiate path control in a network;
    a packet-header-offset-determination module configured to, in response to the path-control-initiating module initiating the path control, determine an offset value to be applied to a packet header of a packet, wherein the packet header comprises a plurality of header fields comprising at least a reserved-bit field;
    a packet-header-modification module configured to modify the packet header by performing an exclusive OR (XOR) operation on the reserved-bit field and the offset value to obtain a modified reserved-bit field, and replacing the reserved-bit field in the packet header with the modified reserved-bit field; and
    a packet-forwarding module configured to forward the packet based on the modified packet header.

13. The path-control apparatus of claim 12, wherein the path-control-initiating module is configured to determine the path-control condition based on a first path computed according to the unmodified packet header of the packet, wherein the packet-forwarding module is configured to forward the packet on a second path computed according to the modified packet header, and wherein the first path and the second path do not overlap.

14. The path-control apparatus of claim 12, wherein, while determining that the path-control condition is met, the path-control-initiating module is further configured to determine a packet loss rate for a particular flow exceeding a predetermined threshold.

15. The path-control apparatus of claim 12, wherein, while determining that the path-control condition is met, the path-control-initiating module is further configured to receive a multipath remote direct memory access (RDMA) operation command.

16. The path-control apparatus of claim 12, further comprising a mapping table storing a mapping relationship between offset values and path differences, and wherein the packet-header-offset-determination module determines the offset value by looking up the mapping table.

17. The path-control apparatus of claim 16, wherein the network comprises a plurality of layers of switches, and wherein the packet-header-offset-determination module determines the offset value by identifying an offset value that maps to a non-zero path difference in each switch layer based on the mapping table.

18. The path-control apparatus of claim 16, wherein the network comprises a plurality of types of switches, and wherein the apparatus further comprises an offline-probing module configured to obtain the mapping table by performing an offline probing operation for each type of switch.

19. The path-control apparatus of claim 16, wherein the network comprises a plurality of types of switches, and wherein the apparatus further comprises an offline-probing module configured to obtain the mapping table by computing hash functions of the packet header modified by the offset values for each type of switch.

20. The path-control apparatus of claim 12, wherein the packet comprises a transport control protocol (TCP) header or a user datagram protocol (UDP) header.

21. The path-control apparatus of claim 12, wherein the header fields further comprise a source-port field and an optional field, and wherein, while modifying the packet header, the packet-header-modification module is further configured to:

perform an XOR operation on the source-port field and the determined offset value; and/or, perform an XOR operation on the optional field and the determined offset value.

22. The path-control apparatus of claim 12, wherein, while forwarding the packet, the packet-forwarding module is further configured to perform equal-cost multipath (ECMP)-based routing.

23. A computer system, comprising:
a processor; and
a storage device coupled to the processor and storing instructions which when executed by the processor cause the processor to perform a method, the method comprising:
  determining that a path-control condition is met;
  determining, by an end host, an offset value to be applied to a packet header of a packet, wherein the packet header comprises a plurality of header fields comprising at least a reserved-bit field;
  performing an exclusive OR (XOR) operation on the reserved-bit field and the offset value to obtain a modified reserved-bit field;
  modifying the packet header by replacing the reserved-bit field in the packet header with the modified reserved-bit field; and
  forwarding the packet based on the modified packet header.

* * * * *